United States Patent [19]
Kubota et al.

[11] Patent Number: 5,631,501
[45] Date of Patent: May 20, 1997

[54] DATA PROCESSING METHOD AND APPARATUS FOR VEHICLE

[75] Inventors: Shinichi Kubota; Eiji Mutoh; Susumu Maeda, all of Wako, Japan

[73] Assignee: Honda Giken Kogyo Kabushiki Kaisha, Tokyo, Japan

[21] Appl. No.: 464,565

[22] Filed: Jun. 5, 1995

[30] Foreign Application Priority Data

Feb. 8, 1995 [JP] Japan ................. 7-042579
May 31, 1995 [JP] Japan ................. 7-155502

[51] Int. Cl.$^6$ ............................. B60R 25/00
[52] U.S. Cl. .................. 307/10.5; 180/287; 395/737
[58] Field of Search ..................... 307/10.1–10.6; 180/287; 361/171, 172; 235/494, 382.5, 382; 70/252, 256, 237; 340/426, 825.31, 825.34, 825.69, 825.72, 825.44, 825.5, 825.51, 825.12, 825.54, 430, 572, 573; 364/230.1, 241.2, 241.4, 246.2, 941, 941.1, 941.2, 424.01, 424.05; 395/868, 737, 733, 739

[56] References Cited

U.S. PATENT DOCUMENTS

| | | | |
|---|---|---|---|
| 4,291,237 | 9/1981 | Kitano | 180/287 |
| 4,366,466 | 12/1982 | Lutz | 180/287 |
| 4,926,332 | 5/1990 | Komuro et al. | 340/825.69 |
| 4,965,460 | 10/1990 | Tanaka et al. | 307/10.2 |
| 5,019,812 | 5/1991 | Göstahagberg et al. | 340/825.31 |
| 5,124,565 | 6/1992 | Yoshida et al. | 307/10.3 |
| 5,168,271 | 12/1992 | Hoff | 340/825.44 |
| 5,343,077 | 8/1994 | Yoshida et al. | 307/10.3 |
| 5,371,796 | 12/1994 | Avarne | |
| 5,412,379 | 5/1995 | Waraksa et al. | 340/825.72 |
| 5,430,437 | 7/1995 | Ichikawa et al. | 340/825.44 |

FOREIGN PATENT DOCUMENTS

| | | |
|---|---|---|
| 0372741 | 6/1990 | European Pat. Off. . |
| 0456916 | 11/1991 | European Pat. Off. . |
| 3928142 | 3/1990 | Germany . |
| 4019478 | 1/1991 | Germany . |
| 4234822 | 4/1993 | Germany . |
| 4418069 | 8/1995 | Germany . |
| 4407966 | 9/1995 | Germany . |
| 4429418 | 2/1996 | Germany . |
| 2046827 | 11/1980 | United Kingdom . |

OTHER PUBLICATIONS

E. Preiss, "Controller Bietet drei Schnittstellen", *Design & Elektronik*, vol. 7, Mar. 26, 1991, pp. 77–78 (with partial English translation).

Färber, G., *Bussysteme*, R. Oldenbourg Verlag München Wien 1987, pp. 109, 123–124 (with partial English translation).

*Primary Examiner*—Richard T. Elms
*Attorney, Agent, or Firm*—Pollock, Vande Sande & Priddy

[57] ABSTRACT

A method and apparatus for vehicular data processing which enable quick, efficient input of first serial data entered from an external device and comparison of the first and second data with prestored second serial data. First serial data is repeatedly sent out asynchronously. The prestored second serial data is sent out in response to a request. Storing of the second serial data is performed until distinctive leading pulse of the first serial data is detected, at which time storing of the second serial data is suspended to permit storing of the first serial data in an interrupt mode.

7 Claims, 7 Drawing Sheets

DATA PROCESSING METHOD AND APPARATUS FOR VEHICLE

BACKGROUND OF THE INVENTION

1. Field of the Invention

The present invention relates to a data processing method and apparatus for a vehicle, whereby a plurality of serial data are selectively read to be processed and, more particularly, to a method and apparatus for vehicular data processing which are suited for a vehicle anti-theft device which reads a key ID code registered beforehand in an engine key or the like and a reference ID code registered beforehand in a vehicle memory, and enables the start of an engine provided that these two ID codes satisfy a predetermined relationship.

2. Description of the Prior Art

Various types of anti-theft apparatuses have been proposed. Among those anti-theft apparatuses, there is one that is designed to immobilize a vehicle by electrical means if an attempt is made to start or drive the vehicle by using an illegitimate key. This is achieved by previously storing an identification code or a key ID code in a key, reading the key ID code when the key is inserted into a key cylinder to start up the engine, comparing it with a reference ID code prestored in the vehicle, generating an enable signal only when there is a match between both ID codes, and enabling the engine to be started up only when an engine control unit successfully receives that signal; see "Car Technology", Vol. 48, No. 8, 1994, pp. 59–64.

An example of such a conventional transponder type immobilizer is shown in FIG. 6. A key 2 includes a memory (not shown) in which a key ID code (for instance, of 64 bits) is prestored, and a transmitter 4 for transmitting the key ID code. The transmitter 4 of the key 2 and a key cylinder 5 are coupled together by, for instance, an induction coil (antenna) 6.

When the key 2 is inserted into the key cylinder and turned to the ignition ON position, an ignition switch 7 is closed. In response to this, an immobilizer CPU 13 incorporated in a hybrid IC for immobilizer control (immobilizer HIC) 10 in an engine control unit (ECU) 30 operates, and operating electric power is supplied from a power amplifier in an antenna unit 19 to the transmitter 4 through the induction coil (antenna) 6. The antenna unit 19 is electrically connected to ECU 30 by a pair of connectors 40 and 50, along with terminal devices of the drive and control systems essential to the engine control such as a fuel injection valve 17 and a fuel pump 18. The moment electric power is supplied to the transmitter 4, the transmitter 4 reads the ID code stored in the key 2 and periodically and continuously sends the ID code in sequence to the key cylinder 5 as long as the ignition stays ON.

The received key ID code is amplified by a power amplifier (not shown) in the antenna unit 19, and read into the immobilizer CPU 13 through an I/F circuit 12 in the immobilizer HIC 10, and temporarily stored in an appropriate ID code register 13B. In an EEPROM 14 of the HIC 10, a unique reference ID code assigned to each vehicle is prestored, and the reference ID code and the key ID code which was read in are compared with each other by a compare unit 13S of the CPU 13. If it is determined that there is a match between the two or they are in a predetermined relationship, an enable signal is transmitted from the compare unit 13S to an engine CPU 16. At the same time, a starter relay is activated to initiate the rotation of a starter motor (not shown).

In a ROM 15 of the engine CPU 16, an engine control program is stored which includes at least an engine control algorithm, an I/O (Input/Output) control algorithm and an anti-theft algorithm. The engine CPU 16 operates according to the engine control program, and discriminates and verifies the reception of an enable signal by the anti-theft algorithm. If the enable signal is correct data, the engine CPU 16 performs a specific control based on the engine control algorithm for the respective terminal devices such as a fuel injection valve 17, a fuel pump 18 and an ignition control unit 20 on the signal port selected by the I/O control algorithm, thereby to enable the start-up of the engine and running of the vehicle.

If the reference ID code stored in the EEPROM 14 and the key ID code transmitted from the key 2 and read in do not match each other or they are not in a predetermined relationship, the compare function unit 13S does not issue an enable signal. Accordingly, the start of the vehicle by the engine CPU 16 is inhibited, and a horn 21 is activated by the CPU 13 to provide an appropriate alarm and display. When the enable signal transmitted from the compare unit 13S is not correct data, the start of the vehicle by the engine CPU 16 is also inhibited. Thus, the illegal startup of the engine and the driving of the vehicle by a wrong key are prevented to ensure the vehicle anti-theft function.

In the conventional transponder type immobilizer described above, the key ID code stored in the key 2 and the reference ID code stored in the EEPROM 14 are alternately read into the CPU 13 by the serial communication system. The reading of the reference ID code out of the EEPROM 14 is initiated in response to a request received from the CPU 13. The key ID code is independently and repeatedly sent out of the transmitter 4 via the antenna unit 19 asynchronously with the operation of the CPU 13.

For the reason stated above, the timing at which a pulse related to the leading data of the key ID code is transmitted does not necessarily coincide with the input timing of the key ID code in the CPU 13. Hence, if the input timing in the CPU 13 is encountered in the middle of sending the key ID code, then the CPU 13 must wait for the transmitting timing of a head of the next key ID code before it can start inputting of the key ID code, presenting a problem such as delay in the subsequent processing.

FIG. 4 and FIG. 5 are the timing charts which show the relationships between the ON/OFF of the ignition switch (IG), pulse signal Px of the key ID code, the input processing of the key ID code, and the reading of the reference ID code. In the timing charts, (a) and (b) indicate two different prior art arrangements whereas (c) depicts the present invention. Key ID code pulse signal Px is comprised of a data pulse train PD which denotes the key ID code, and a leading pulse P1 which is added at the beginning of each data pulse train PD to clarify a break between two successive PD data pulse trains. FIG. 4 shows a case wherein the first key ID code pulse detected immediately after the ignition is actuated, is the leading pulse P1; FIG. 5 shows a case wherein the aforesaid first key ID code is not the leading pulse P1.

According to the first prior art arrangement shown in FIG. 4(a), each time a change (rising up or falling down) in ID code pulse signal Px is detected, interrupt processing for the input of the key ID code is performed with a priority. Hence, when the Ignition switch is turned ON at time to, the reference ID code is first read until a change in ID code pulse signal Px is detected. If a fall in the key ID code pulse Px is detected at time t2, interrupt processing for the input of the key ID code then takes place and the reading of the reference ID is suspended. After that, when the input processing of the key ID code is completed at time t4, the reading of the reference ID code is resumed.

If, however, another fall in the key ID code pulse signal Px is detected at time t5, then there will be another Interruption of the input processing of the key ID code even though the input of the key ID code has been completed, thus suspending the reading of the reference ID code. This causes completion of the reading of the reference ID code to be delayed to time t9; therefore, the key ID code cannot be compared and checked until time t9.

According to the second prior art arrangement shown in FIG. 4(b), priority is given to the reading of the reference ID code. When the ignition switch is turned ON at time t0, the reading of the reference ID code begins at time t1 and when its reading is completed at time t3, the input processing of the key ID code is initiated. If leading pulse P1 of the key ID code cannot be detected at time t3, i.e. if data pulse train PD cannot be read from the first data pulse, then the program must wait until the next leading pulse P1 is finished at time t5 before It begins the input processing of the key ID code. This results in a wasteful waiting time (loss time) with a consequent delay in comparing and checking timing of the ID code.

As illustrated in FIG. 5, when the key ID code pulse detected first after the ignition switch is turned ON at time t0, is not leading pulse P1, the input processing of the key ID code is begun at time t1 according to the first prior art arrangement (a); however, no substantially effective input is performed. Effective input is started at time t5 at which the next leading pulse P1 falls down, thus causing a wasteful time. According to the second prior art arrangement (b), a middle of the key ID code is being output at time t6 at which the reading of the reference ID code is completed and the program therefore waits until time t9 at which the next leading pulse P1 falls before it can start the input processing of the key ID code. The second prior art, therefore, also presents a problem of significant waste of time.

SUMMARY OF THE INVENTION

An object of the present invention is to provide a method and apparatus for vehicular data processing which enable quick, efficient input of first serial data such as a key ID code which is supplied in sequence from the outside and second serial data, i.e. a reference ID code which is stored beforehand in an external memory such as an EEPROM.

To this end, the present invention is characterized by the provision of means described below.

(1) A vehicular data processing apparatus of the present invention was equipped with a first storing means for receiving and storing first serial data sent from an external device, means for sending out second serial data in response to a request, second storing means for reading and storing the second serial data, serial data registering means for selectively registering the first and second serial data in the first and second storing means in a time sharing mode, and means for detecting the leading data of the first serial data, wherein said serial data registering means reads and stores the second serial data sent in response to the request until said leading data is detected, and receives and stores the first serial data in an Interrupt mode when the leading data of the first serial data is detected.

(2) A vehicular data processing method for selectively reading first and second data and for carrying out predetermined processing on the respective data, wherein: the reading of the first data is implemented by interrupting the reading of the second data, said interrupt processing being disabled under a predetermined condition.

(3) A vehicular data processing apparatus of the present invention was equipped with a storing means for managing and storing n pieces of data constructing first serial data, which are repeatedly sent from outside a vehicle, so that they are stored in the order in which they are received, and said n being a known integer, leading data determining means for determining whether each received data is a leading data of the first serial data, leading data managing means for discriminating the leading data from other data, and data constructing means for constructing the first serial data by rearranging said n pieces of data, which have been arranged in an order they were received, on the basis of said leading data.

With the arrangement described in (1) above, the processing of the second serial data is carried out until the leading data of the first serial data is detected, and as soon as the leading data of the first serial data is detected, the processing of the second serial data is suspended to allow the interrupt of the processing of the first serial data. This enables effective use of the time until the leading data of the first serial data is detected thereby permitting efficient, quick processing of each serial data. Moreover, applying the vehicular data processing apparatus to the input and reading of the key ID code and the reference ID code of a vehicle anti-theft device enables quick theft determination.

With the arrangement described in (2) above, the interrupt processing for reading the first data is prohibited under a predetermined condition. This prevents the interrupt processing from being continuously implemented under a condition wherein no Interrupt processing is required thus causing no interference with the reading of the second data.

With the arrangement described in (3) above, an ID code can be constructed by using a key ID code which is entered in the middle, thus permitting quick recognition of the key ID code without any waste of time.

DETAILED DESCRIPTION OF THE PREFERRED EMBODIMENTS

Figure 1:
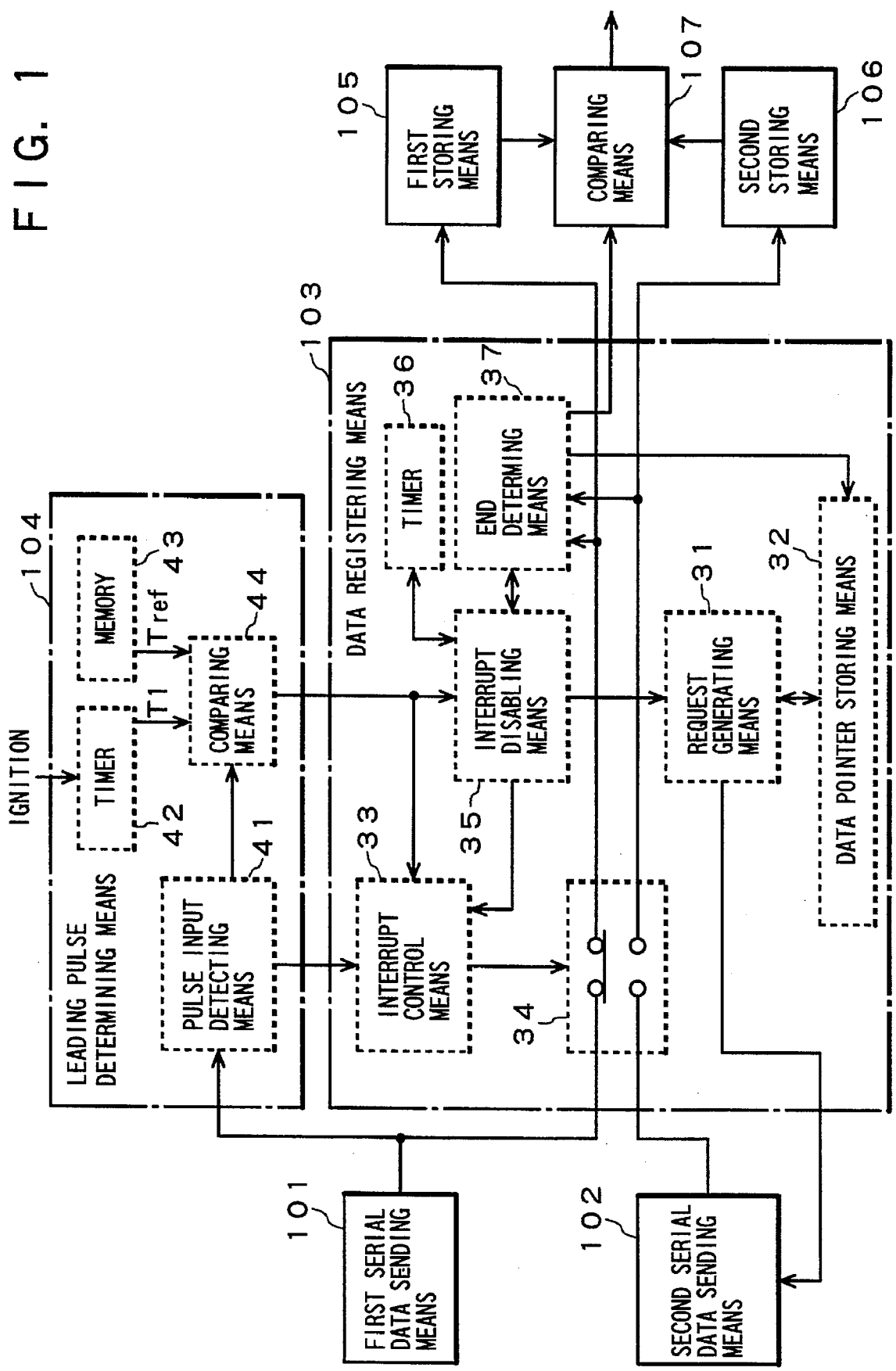
FIG. 1 is a block diagram showing a first embodiment of the present invention.
Figure 6:
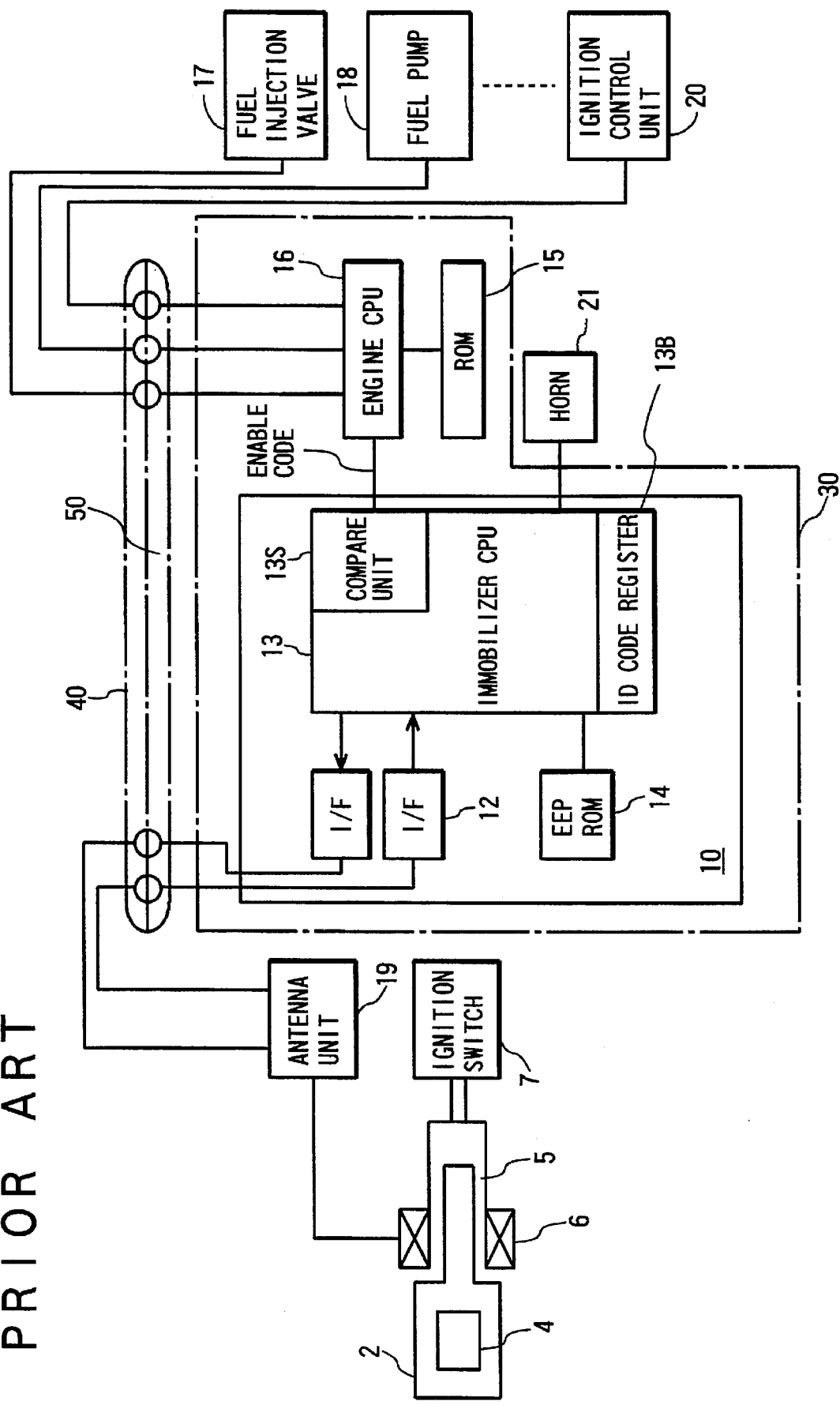
FIG. 6 is a block diagram showing a prior art transponder type immobilizer.

The present invention will be described in more detail with reference to the accompanying drawings. FIG. 1 is the block diagram illustrative of the functions of the essential section of the present invention; it particularly shows the function of the CPU 13 of the transponder type immobilizer shown in FIG. 6.

First serial data sending means 101 corresponds to a transmitter 4 or the like which transmits, for example, the aforesaid key ID code and it repeatedly sends out the first serial data, i.e. the key ID code, asynchronously with the operation of the CPU 13. Leading pulse determining means 104 determines whether or not a pulse signal sent out in sequence from the first serial data sending means 101 is leading pulse P1 of the first serial data. Second serial data sending means 102 corresponds, for example, to the EEPROM 14; it sends out the second serial data, i.e. reference ID code, in response to a request from the CPU 13.

Data registering means 103 registers the serial data received from the first and second serial data sending means 101 and 102, respectively, in first and second storing means 105 and 106, respectively. To be more specific, the data registering means 103 registers the reference ID code, obtained in response to the request, in the second storing means 106 until the leading pulse of the key ID code, i.e. the first serial data, is detected by the leading pulse determining means 104; the key ID code is registered in the first storing means 105 in an interrupt mode as soon as the leading pulse of the key ID code is detected.

In the leading pulse determining means 104, pulse input detecting means 41 detects a change in the pulse signal of the key ID code so as to determine the input of the pulse. A timer 42 measures a time T1 from the moment the ignition switch is turned ON. Stored in a memory 43 is reference time Tref for determining the leading pulse of the key ID code, which will be discussed later. Comparing means 44 compares the time T1 counted by the timer 42 with the reference time Tref when a change in the pulse signal is detected by the pulse input detecting means 41 so as to decide whether the pulse detected is a leading pulse P1 in accordance with the comparison result. If the detected pulse is determined to be a leading pulse P1, then an instruction is given to the data registering means 103 to register the key ID code. If IL is determined that the pulse is not the leading pulse, then an instruction for registering the reference ID code is given.

In the data registering means 103, when the leading pulse determining means 104 decides that an incoming pulse is not a leading pulse, request generating means 31 issues a request to the second serial data sending means 102 for sending the data specified by a data pointer stored in data pointer storing means 32.

If the pulse input detecting means 41 detects a change in the ID code pulse and the comparing means 44 determines that the incoming pulse is a leading pulse P1, then interrupt control means 33 switches input data switching means 34 to connect the first serial data sending means 101 with the first storing means 105. Conversely, if it is determined that the incoming pulse is not a leading pulse P1, then the second serial data sending means 102 is connected to the second storing means 106. The first and second serial data are stored in memories 105 and 106 respectively in a time sharing mode.

Interrupt disabling means 35 disables the switching control performed by the interrupt control means 33 over the input data switching means 34 for a predetermined time which is set on an interrupt disabling timer 36 when the incoming pulse is not a leading pulse P1. In this embodiment, the predetermined time is set to a longest possible time, provided that it does not exceed Interval time Δ P1 so as not to overlook leading pulse P1 of pulse signal Px. End determining means 37 decides whether the storing of respective serial data in the storing means 105 or 106 has been completed. Comparing means 107 compares the two ID codes respectively stored in the first and second storing means 105 and 106 and sends out the checking result to the engine CPU 16.

Figure 2:
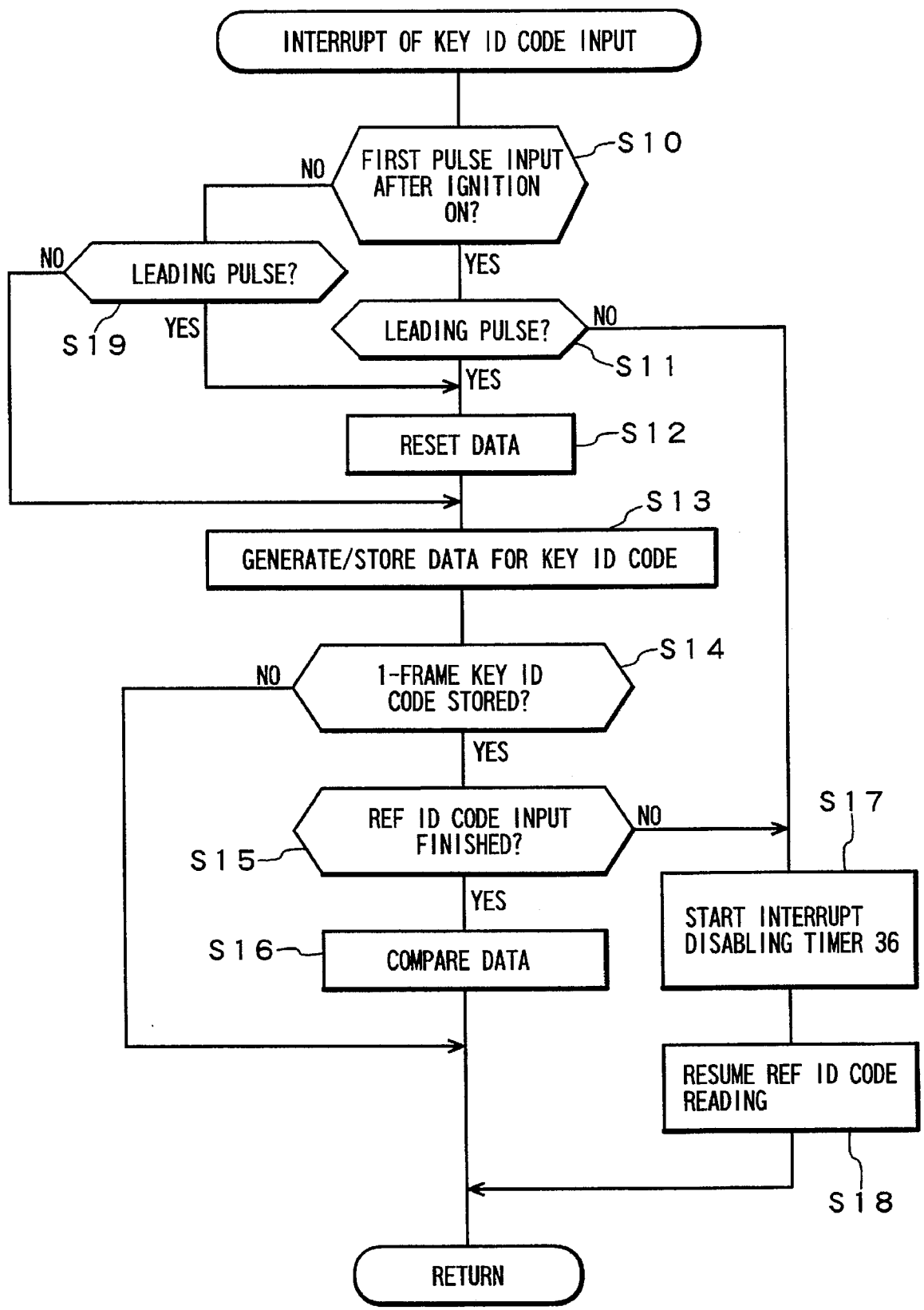
FIG. 2 is a flowchart showing an operation of a key ID code input processing according to the first embodiment of the present invention.
Figure 3:
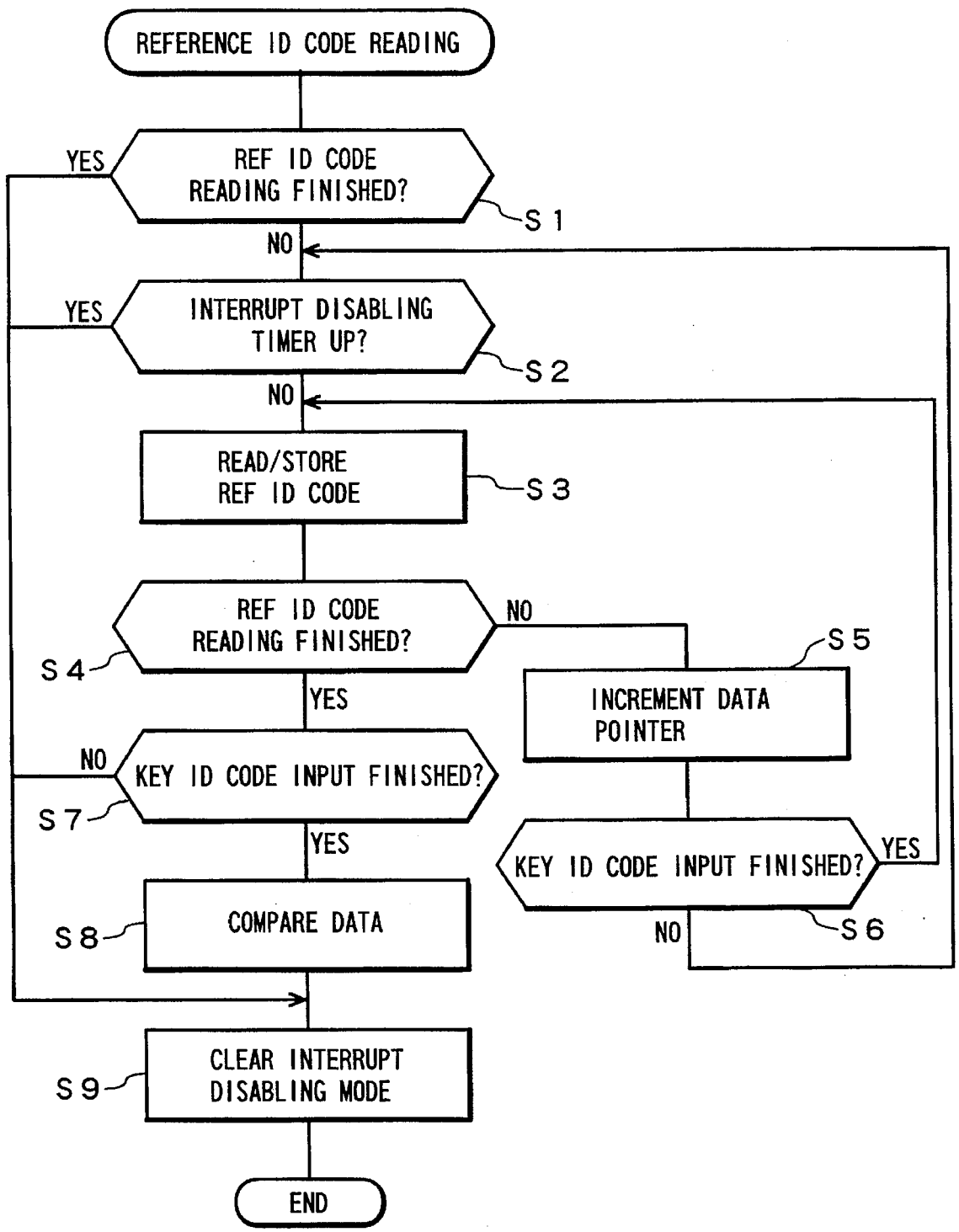
FIG. 3 is a flowchart showing an operation of a reference ID code input processing in the first embodiment.
Figure 4:
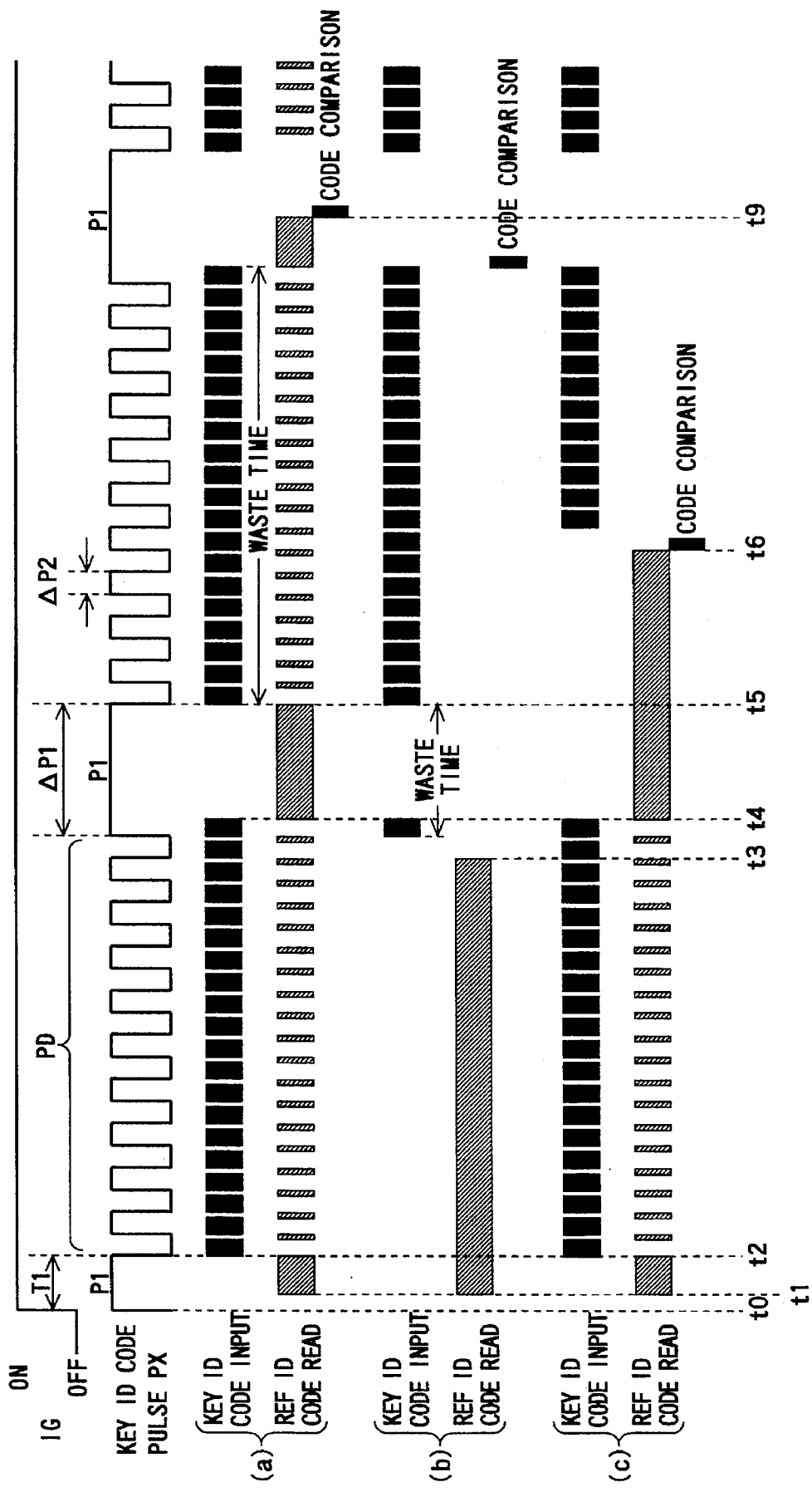
FIG. 4 is a timing chart showing an operation timing of the present invention compared with prior art.
Figure 5:
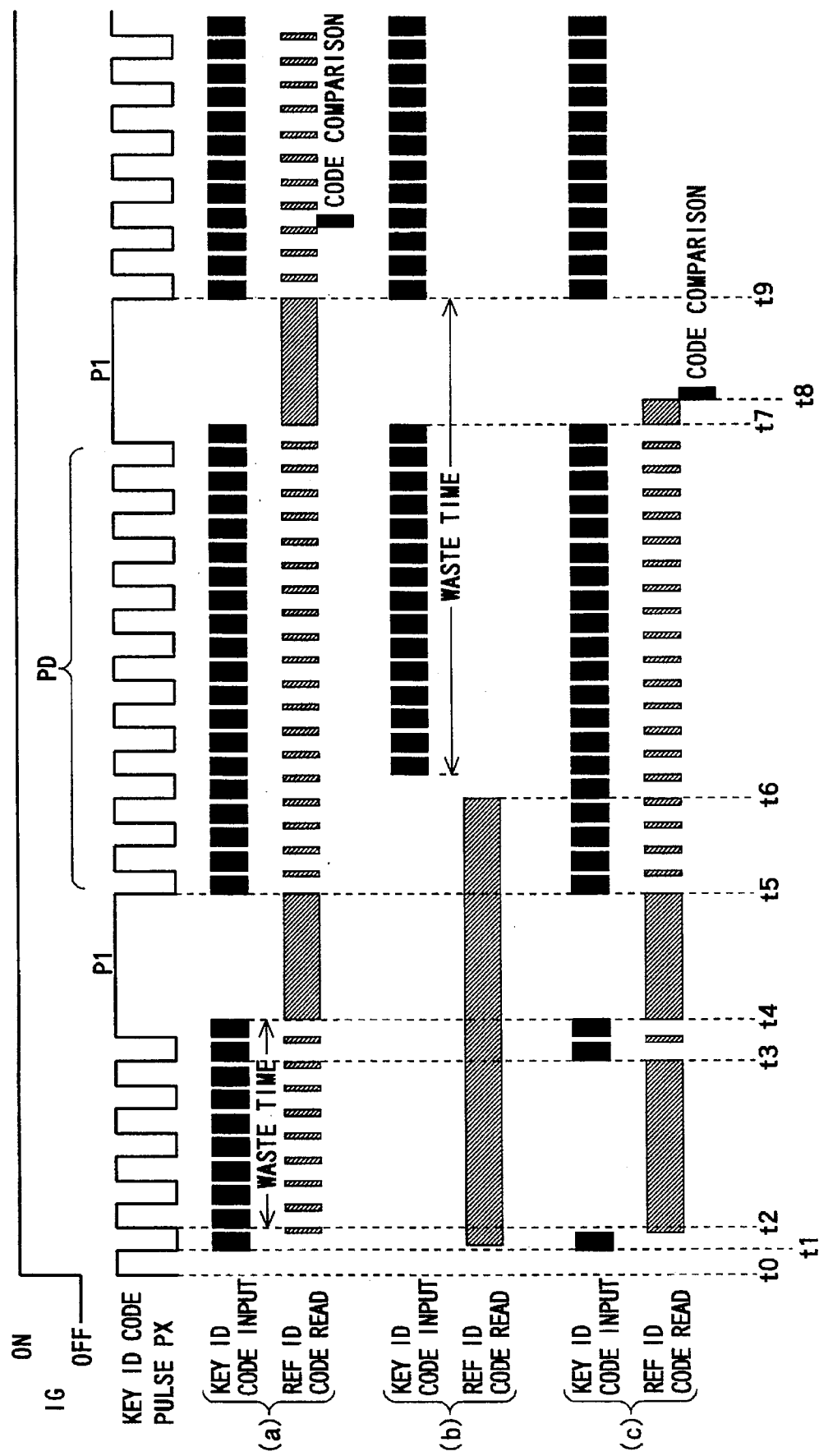
FIG. 5 is a timing chart showing another operation timing of the present invention compared with prior art.

FIGS. 2 and 3 are the flowcharts illustrative of the operation of the embodiment; FIG. 4(c) and FIG. 5(c) are the timing charts thereof. FIGS. 4 and 5 are based on the assumption that the input processing of the key ID code is performed in response to changes (rise and fall) in pulse signal Px. The operation which will be described in conjunction with FIGS. 2 and 3, however, is based on an assumption that the input processing of the key ID code is carried out in response to only the fall of pulse signal Px. The operation performed in response to both rise and fall in the signal Px can be easily understood from FIGS. 4(c) and 5(c); therefore, the description thereof will be omitted.

First, referring to the timing chart of FIG. 4(c) and the flowcharts, the description will be given of the operation which is performed when the first ID code pulse Px, which is first detected after the ignition switch is turned ON, is a leading pulse P1. When the key 2 is inserted in the key cylinder 5 and the ignition switch is turned ON at time t0, the timer 42 in the leading pulse determining means 104 starts counting elapsing time T1 therefrom. The first serial data sending means 101 begins sending out pulse signal Px which corresponds to the key ID code. At time t1. the reference ID code reading process shown in FIG. 3 is initiated.

In step S1, it is determined whether or not the reading of the reference (REF) ID code has been completed; since the reading has not yet been completed at this point, the process proceeds to step S2 wherein it is determined whether or not the time set on the interrupt disable timer 36, which is to be discussed later, has elapsed. If the time has not elapsed yet, then the interrupt control means 33 switches the input data switching means 34 over to the second serial data sending means 102 in step S3 and also, at the same time, the request generating means 31 sends out a data pointer stored in the data pointer storing means 32 to request the second serial data sending means 102 to read the data stored at the address which corresponds to the data pointer. The reference ID codes, which are sent out in sequence In response to the request, are stored in the second storing means 106 via the input data switching means 34.

In step S4, the end determining means 37 determines whether or not the reading of all reference ID codes has been completed; if it has not yet been completed, then the data pointer registered in the data pointer storing means 32 is incremented in step S5. In step S6, it is determined in the same manner as that of the prior art whether or not the input of one frame of the key ID code has been completed; since it has not yet been completed at this point, the process goes back to step S2 to continue reading of the reference ID codes.

During the reading of the reference ID codes, if the pulse input detecting means 41 in the leading pulse determining means 104 detects the falling edge of the key ID code pulse at time t2, then the reading of the reference ID codes, which is being performed, is suspended to allow the interrupt of the input processing of the key ID code shown in FIG. 2.

In the input processing of the key ID code, it is determined in step S10 whether or not the key ID code pulse received is the first one after the ignition switch was turned ON. Since it is determined to be the first pulse in this stage, the process proceeds to step S11. In step S11, the comparing means 44 compares count value T1 on the timer 42 with reference time Tref stored in the memory 43 so as to decide whether or not the first pulse is a leading pulse P1 of the key ID code.

The reference time Tref is set to an appropriate value which is shorter than pulse width Δ P1 of leading pulse P1 and longer than pulse width Δ P2 of the following data pulse. If the count value T1 exceeds reference time Tref, then the received pulse is determined to be a leading pulse P1; if count value T1 is smaller than reference time Tref, then the received pulse is determined to not be a leading pulse P1.

As shown in the timing chart of FIG. 4(c), if the pulse received immediately after the ignition switch is turned ON is a leading pulse P1 of the key ID code, then all of the content stored in the first storing means 105 are reset in step S12. In step S13, the interrupt control means 33 switches the input data switching means 34 over to the first serial data sending means 101, i.e. the key ID code side, and data corresponding to the ID code pulse to be entered is generated and stored in the first storing means 105. In step S14, the end determining means 37 determines whether or not the storing of one frame data (9-bit in this embodiment) has been completed, and if it finds that the storing has not yet been completed, then the interrupt process is terminated.

After that, the interrupt process is activated each time the fall of the ID code pulse is detected. Since the determination result in step S10, however, is negative this time, the process advances to step S19. In step S19, it is determined whether or not the received pulse is the leading pulse in the same manner as that of the prior art. The determination in step S19 is negative for a while and the data which correspond to the pulses entered in sequence are sequentially stored without being reset in step S13. When storing of one frame of the key ID code is completed, i.e. when the determination result in step S14 is affirmative at time t4, it is further determined in step S15 whether the reading of the reference ID codes has been completed or not; since it has not yet been completed at this point, the processing program goes to step S17.

In step S17, the timer 36 of the interrupt disabling means 35 is started. After that, the interrupt, which is activated when the leading pulse determining means 104 detects the fall of ID code pulse Px, is disabled by the Interrupt disabling means 35 for a predetermined time. In step S18, the reading of the reference ID codes, which has been suspended, is resumed.

The resumed reading of the reference ID codes is restarted with a step which has been suspended. At this point, the input of the key ID codes has been completed and the determination result in step S6 is therefore affirmative, so that the processing in steps S3 to S6 is repeated without the determination of step S2. Hence, the interrupt processing of the key ID code input is not activated even if the fall of the pulse signal is detected, for example, at time t5.

After that, when the reading of the reference ID codes is completed at time t6, the process proceeds from step S4 to step S7. The reading of one frame of the key ID code has been completed in step S7 and therefore the process proceeds to step S8 wherein the comparing means 107 compares the read key ID code with the reference ID code and the comparison result is sent to the engine CPU 16. In step S9, the interrupt disabling mode effected by the ID code pulse is cleared.

The operation performed when the first ID code pulse, which is first detected after. The ignition switch is turned ON, is not the leading pulse P1 will now be described with reference to the timing chart of FIG. 5(c) and the flowcharts of FIGS. 2 and 3. In FIG. 5(c), the input processing of the key ID code is carried out in response to both rise and fall of pulse signal Px. The operation which will be described now, however, is carried out only in response to the fall of pulse signal Px.

When the key 2 is inserted in the key cylinder 5 and the ignition switch is turned ON at time t0, the timer 42 in the leading pulse determining means 104 starts counting elapsing time T1. The first serial data sending means 101 begins sending out the key ID code pulses. As shown in FIG. 5(c), when the fall of pulse signal Px is detected at time t1 after the power is turned the input processing of the key ID codes is started In the same manner as described above.

It is determined in step S11 that the fall of the pulse detected first is not that of leading pulse P1 of the ID code pulse and the process therefore proceeds to step S17. In step S17, the timer 36 of the interrupt disabling means 35 is activated in the same manner as stated above so as to disable the interrupt for the input processing of the key ID codes for the predetermined time, which interrupt began to be activated when the fall of the pulse is detected. In step S18, the reading of the reference ID codes is initiated.

When the reading of the reference ID codes is started, it is determined in step S1 whether or not the reading of the reference ID codes is completed. Since the determination result is negative at first, the process proceeds to step S2. In step S2, it is determined whether or not the time is over, which has been set on the interrupt disabling timer 36 in step S17. If the time is not over yet, then the interrupt control means 33 switches the input data switching means 34 over to the second serial data sending means 102, i.e. the reference ID code side, in step S3 and also at the same time, the request generating means 31 issues a request to the second serial data sending means 102 for reading the data stored in the address which corresponds to the data pointer value registered in the data pointer storing means 32. As a result, the reference ID codes which are sent out in sequence In response to the request signal are stored in the second storing means 106.

In step S4, the end determining means 37 determines whether the reading of all reference ID codes has been completed; if it has not yet been completed, then the data pointer value is incremented in step S5. In step S6, it is determined in the same manner as mentioned above whether the input of one frame of the key ID code has been completed; since it has not yet been completed at this point, the process goes back to step S2 to repeat the time-up determination and the reading of the reference ID codes described above.

The reading and the storing of the reference ID codes stated above are repeated until the time-up of the interrupt disable timer 36 is detected in step S2 or the completion of the reading of the reference ID codes is detected by the end determining means 37 in step S4. As soon as it is detected that the time set on the interrupt disable timer 36 is up, the Interrupt disabling is cleared in step S9.

When the fall of ID code pulse Px is detected at time t3 after that, the input processing of the key ID codes of FIG. 2 is activated again. This, however, is not the first pulse input after the ignition switch is turned ON; therefore, the process moves from step S10 to step S19. In step S19, it is determined in the same manner as stated above whether the detected pulse is leading pulse P1 or not; it is determined that the pulse is not leading pulse P1 In this case and it proceeds to step S13 wherein entered key ID code pulse is read to be stored. The pulses thus stored will be reset in step S12 when leading pulse P1 is detected later. In step S14, it is determined whether or not the data input of one frame has been completed; if the determination result is negative, then the Interrupt process halts at time t4 and the reading of the reference ID codes which has been suspended, is resumed.

As soon as the reading of the reference ID codes is resumed, the storing of the reference ID codes In the second storing means 106 is accordingly resumed as described previously. When the fall of leading pulse P1 of the key ID code is detected at time t5, the input processing of the key ID codes is activated again in the interrupt mode. After that, the interrupt input processing of the key ID code is preferentially performed until it is completed. If the reading of the reference ID codes has not yet been completed, i.e. if the determination in step S15 is negative when the input of the key ID codes is completed. i.e. when the determination in step S14 is affirmative, at time t7, then the reading of the reference ID codes is reactivated in steps S17 and S18. When the reading of the reference ID codes is completed at time t8, i.e. when the determination in step S4 is affirmative, the respective data are compared in step S8.

According to the present invention, storing of the reference ID codes is preferentially performed until the leading pulse P1 of the key ID code is detected for the first time after the ignition switch is turned on, and as soon as the leading pulse P1 of the key ID code is detected, the storing of the reference ID codes is suspended to allow the interrupt processing for the storing of the key ID code. This enables effective use of the time until the leading data of the key ID code is detected, thus permitting efficient, quick storage of respective serial data. Moreover, the reading, comparing, and checking of the key ID codes and the reference ID codes can be accomplished in a shorter time, thereby permitting quick theft determination.

Furthermore, according to the present invention, if the reading of a reference ID code has not been completed when the input processing of a key ID code has been completed, then the interrupt of the input processing of the key ID code is disabled. This prevents the reading of the reference ID code from being suspended.

Figure 7:
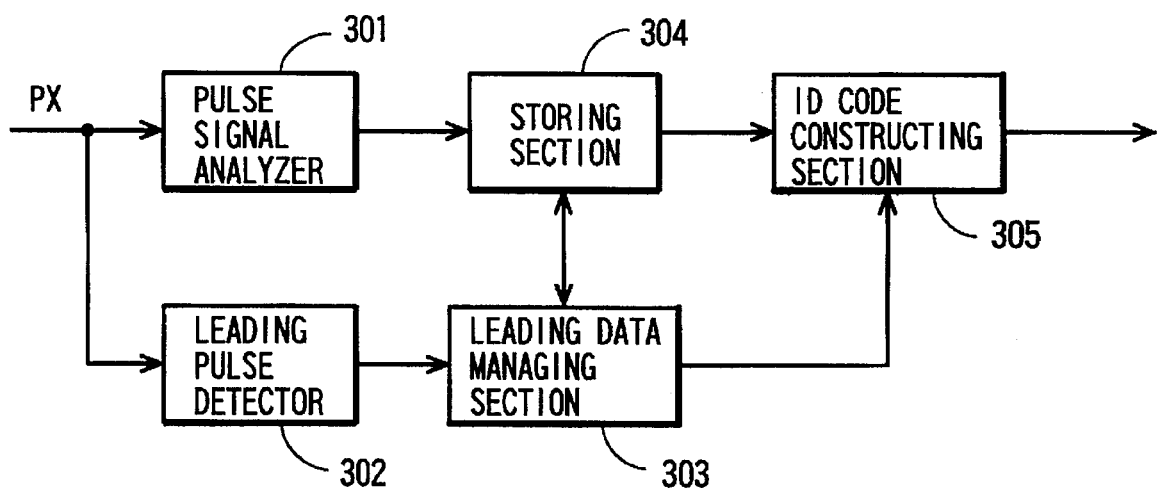
FIG. 7 is a block diagram showing principal parts of a second embodiment of the present invention.

FIG. 7 is a block diagram showing principal parts of a second embodiment of the present invention. This embodiment is characterized in that, even when the leading pulse P1 of the key ID code pulse train PX cannot be detected, the bit data which corresponds to the received key ID code pulse PX is stored and the stored data are rearranged as soon as the storing of one frame of data is completed, thereby constructing a legitimate ID code.

A pulse signal analyzer 301 analyzes whether a received pulse signal represents "1" or "0" according to the waveform of the pulse signal and it outputs the analysis result as one bit of the key ID code. A storing section 304 stores in sequence the bit data output from the pulse signal analyzer 301. A leading pulse detector 302 detects leading pulse P1 of ID code pulse PX In the same manner as stated above. When the leading pulse detector 302 detects the leading pulse P1, a leading data managing section 303 manages the data, which is supplied to the storing section 304 next, as leading data D1. An ID code constructing section 305 rearranges the data array stored in the storing section 304 on the basis of the result of management by said leading data managing section 303 so as to reconstruct an ID code which establishes leading data D1 as the most significant bit.

Figure 8:
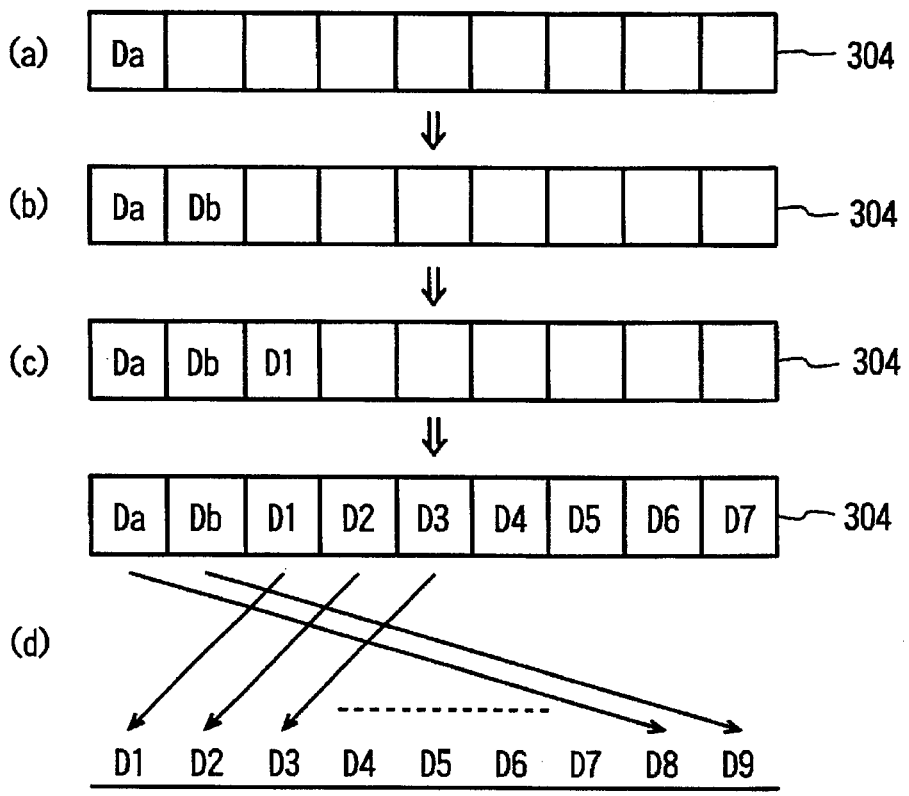
FIG. 8 is a diagram which schematically shows the operation of reconstructing the key ID code according to the present invention.

FIG. 8 is a diagram which schematically shows the operation of reconstructing the key ID code according to the present invention. The invention will be described on an assumption that the key ID code is composed of 9-bit data.

If the pulse signal which is detected immediately after the ignition switch is turned on is not leading pulse P1, then as shown in FIG. 8(a), one bit of data Da corresponding to the pulse signal is stored in the storing section 304. If the pulse which is secondly detected next is not leading pulse P1, either, then as shown in FIG. 8(b), data Db corresponding to the pulse signal is stored in the storing section 304 as the data following data Da. If the pulse thirdly detected is determined to be leading pulse P1 by the leading pulse detector 302, then the data corresponding to the pulse signal thirdly detected is managed as the most significant bit data of the key ID code by the leading data managing means 303 and it is stored as leading data D1 in the storing section 304 as shown in FIG. 8(c).

The data entered after that are stored in order as the second-bit data D2, the third-bit data D3, and so on. Thus, when the seventh-bit data D7 has been stored to complete the storing of a total bits of data, it is determined that the storing of one frame data has been completed. Since the location where leading data D1 has been stored is known, it can be easily known that data Da firstly stored is the eighth-bit data DS and data Db is the ninth-bit data D9. The ID code constructing section 305 rearranges the one frame data to create the legitimate key ID code as shown in FIG. 8(d) on the basis of the location where leading data D1 is stored. The constructed key ID code is compared with the reference ID code which is subsequently read.

According to the present invention, an ID code can be constructed by using a key ID code which is entered in the middle, thus permitting quick recognition of the key ID code without any waste of time.

According to the present invention, the following advantages are achieved.

(1) Storing of the second serial data is performed until the leading pulse of the first serial data is detected, and as soon as the leading pulse of the first serial data is detected, the storing of the second serial data is suspended to allow the interrupt processing for the storing of the first serial data. This enables effective use of the time until the leading pulse of the first data is detected, thus permitting efficient, quick capture of respective serial data. Applying the vehicular data processing apparatus of the present invention to the reading, comparing, and checking of a key ID code and a reference ID code in a vehicle anti-theft device enables quick theft determination.

(2) If the reading of the second serial data has not been completed when the input processing of the first serial data has been completed, then the interrupt of the input processing of the first serial data is disabled. This prevents the reading of the second serial data from being suspended.

(3) A key ID code can be constructed by making use of a key ID code received from the middle thereof without any waste of time.

What is claimed is:

1. A vehicular data processing apparatus comprising:
first storing means for receiving and storing first serial data sent from an external device, said first serial data comprising distinctive leading data followed by other data, means for sending out second serial data in response to a request;

second storing means for reading and storing the second serial data;

serial data registering means for selectively registering the first and second serial data in corresponding ones of the first and second storing means in a time-sharing mode;

means for comparing the first and second serial data stored in said first and second storing means, respectively; and means for detecting said distinctive leading data of the first serial data; said serial data registering means being operative to read and store the second serial data sent in response to the request until said leading data is detected, and being operative to receive and store the first serial data in an interrupt mode after the leading data of the first serial data has been detected.

2. A vehicular data processing apparatus according to claim 1, wherein said serial data registering means does not carry out said interrupt mode processing if a further occurrence of said leading data is detected after the storing of the first serial data has been completed.

3. A vehicular data processing method for selectively reading first data sent from an external device and prestored second data sent in response to a request for comparing said first and second data, wherein said prestored second data is read initially, and the reading of said first data is performed by interrupting the reading of the second data, said interrupting being disabled under a predetermined certain condition.

4. A vehicular data processing method according to claim 3, wherein said first and second data are serial data, said first data comprises distinctive leading data followed by other data, and said interrupting is performed in response to the detection of said distinctive leading data of said first serial data.

5. A vehicular data processing method according to claim 3, wherein said first data comprises distinctive leading data followed by other data, and said predetermined certain condition under which said interrupt is disabled is at least one of the completion of reading of the first data and the detection of data which is not the leading data of the first data.

6. A vehicular data processing method according to claim 3, wherein said first data is related to an ID code registered in an engine key and the second data is related to an ID code registered in a vehicle.

7. A vehicular data processing apparatus comprising:

storing means for managing and storing n pieces of data comprising first serial data, repeatedly sent from outside a vehicle, so that said n pieces of data are stored in the order in which they are received, n being a known integer and one of said n pieces of data being distinctive leading data;

means for determining whether each piece of received data is a leading data of the first serial data;

means for separating the leading data from other data;

means for constructing the first serial data by rearranging said n pieces of data, which have been arranged in the order they were received, on the basis of said leading data;

means for sending second serial data in response to a request;

means for comparing said constructed first serial data with the second serial data, and means for executing predetermined data processing on the basis of a comparison result.

* * * * *